United States Patent
Bonomo

[15] 3,680,889
[45] Aug. 1, 1972

[54] BABY WALKING TRAINER
[72] Inventor: Joseph A. Bonomo, 5039 Sky Parkway, Sacramento, Calif. 95823
[22] Filed: Oct. 7, 1970
[21] Appl. No.: 78,700

[52] U.S. Cl. .............. 280/47.25, 272/703, 297/345
[51] Int. Cl. ............................................. B62b 7/02
[58] Field of Search...... 280/7.1, 47.17, 47.24, 47.25, 280/47.34, 47.38, 47.18; 272/70, 70.3; 297/5, 6, 130, 274, 345

[56] References Cited

UNITED STATES PATENTS 3,542,419  11/1970  Spinola ........................ 297/130
97,078  11/1869  Goulding ..................... 272/70.3
3,081,108  3/1963  Vogt ............................. 280/47.19
2,670,216  2/1954  Leonard .................. 280/47.25 X
2,990,190  6/1961  Eriksen .................. 280/47.25 X
572,613  12/1896  Packard ....................... 272/70.3
3,170,709  2/1965  Shackel ..................... 280/47.34

Primary Examiner—Benjamin Hersh
Assistant Examiner—Leslie J. Paperner
Attorney—Alexander B. Blair

[57] ABSTRACT

A wheeled frame, a back and harness detachably mounted to the top of the frame, a seat detachably mounted to the back, and a handle pivotally mounted to the top of the frame.

4 Claims, 4 Drawing Figures

PATENTED AUG 1 1972 3,680,889

INVENTOR.
JOSEPH A. BONOMO
BY
Alexander B. Blair
ATTORNEY.

BABY WALKING TRAINER

This invention relates to a device which may be used for training babies to walk, for wheeling babies around, and for harnessing babies in a chair.

Accordingly, a primary object of this invention is the provision of an adjustable trainer for aiding any height baby to walk.

Another object of this invention is the provision of a trainer which also serves as a two wheel carriage upon which the baby sits.

A further object of this invention is the provision of a harness which is detached from the trainer for baby wear.

Figures 1, 2:
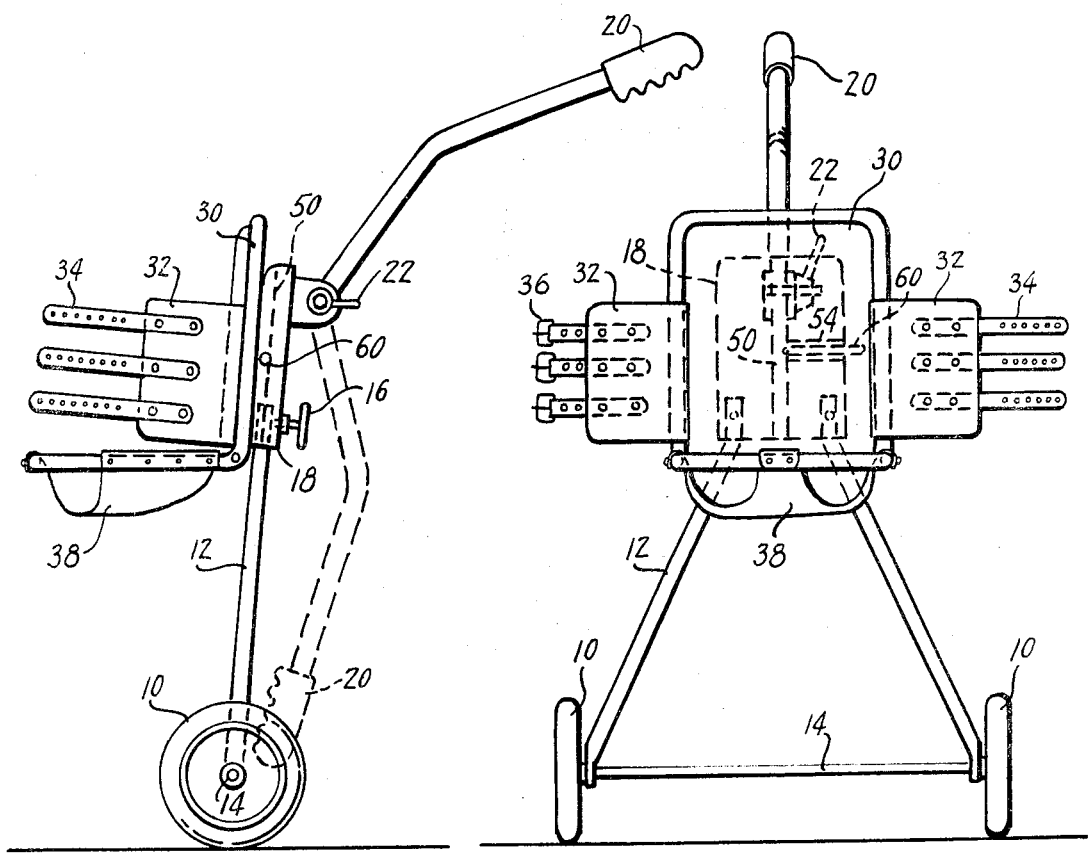
Figures 3, 4:
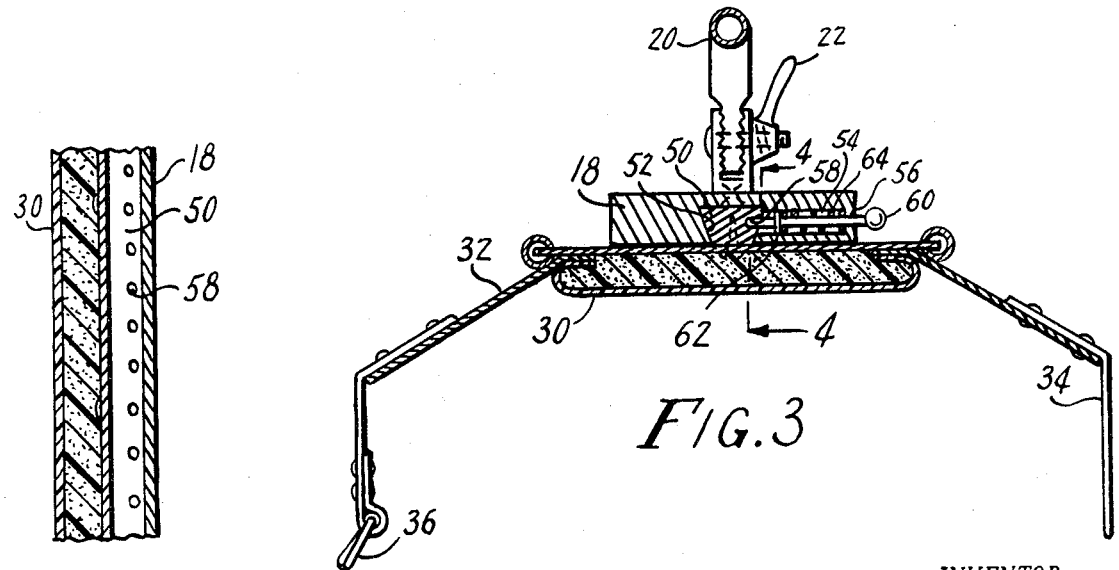

The above and other objects of this invention will become apparent to those skilled in the art after a consideration of a preferred embodiment of this invention taken together with the accompanying drawing wherein:

FIG. 1 is a front view of the trainer;
FIG. 2 is a side elevational view thereof;
FIG. 3 is a plan view thereof without the seat; and
FIG. 4 is a sectional view taken on line 4—4 of FIG. 3.

Referring in detail to the drawing, there is shown two wheels 10 and two legs 12 attached to an axle 14. Detachably mounted over the top of each leg 12 by means of a hand bolt 16 is a frame 18. A foldable handle 20 which may be locked into position by means of a toothed locking device 22 is pivotally mounted at the rear of frame 18.

Adjustably and releasably attached to the front of frame 18 is a back 30. A harness 32 is secured at each side of the front of back 30 and has straps 34 and buckles 36 for firmly and comfortably holding any sized baby. A detachable seat 38 is mounted to back 30 so that the baby may be wheeled about in a sitting position as he is strapped in by harness 32.

Vertically secured to the back portion of back 30 is a longitudinal projection 50 having a trapezoidal cross-section. Projection 50 mates with a slot 52 within frame 30. As clearly shown in FIGS. 3 and 4, there is a hole 54 along one side of frame 30 between the outer edge 56 and slot 52. Projection 50 has a series of holes 58 along one side thereof in vertical alignment with the center of hole 54. A bolt 60 having lugs 62 extending therefrom toward the end thereof is inserted in hole 54 together with a spring 64 about bolt 60 between lugs 62 and the head of bolt 60. Edge 56 at the perimeter of hole 54 is peened inward so as to narrow the entrance to hole 54 and prevent spring 64 from coming out of hole 54. With seat 38 attached or detached, back 30 and harness 32 may be adjusted to any height to accommodate the height of the baby who is to walk with the aid of the trainer by merely pulling bolt 60 out of hole 58 and letting spring 64 push bolt 60 back in to one of the holes 58 when back 30 is at the desired height. Seat 38, back 30, and harness 32 may be simply released from frame 30 by pulling bolt 60 out of hole 58 and sliding projection 50 vertically out of slot 52.

It should be pointed out that the trainer may serve a dual function as a two-wheeled carriage for moving the child around and as a chair merely by pivoting handle 20 downward and locking it into position to form a third leg allowing the child to sit in a substantially vertical position.

It should not be lost sight of the fact that the basic function of the training device is to give the child who is ready to walk the confidence and support of standing in an upright position while having both arms and legs free for learning to walk in a natural upright stance. The leverage controlled by the parent can, at all times, keep the child's feet at the proper height to just touch the surface being walked on by means of handle 20. The child's natural forward movement propels the device while being guided by the parent. If the child should falter, the parent may quickly tilt the device slightly backward allowing the child to regain balance.

While the preferred embodiments of this invention have been illustrated and described, it should be understood by those skilled in the art that many changes and modifications may be resorted to without departing from the spirit and scope of this invention.

I claim:

1. A trainer, comprising a two wheeled frame, a housing detachably mounted to the top of said frame, a harness adjustably and releasably connected at the front surface of said housing for firmly and comfortably holding a child in an upright position, means pivotally connected to the back of said housing for guiding and holding up the trainer, said harness allowing any height child to have his feet just barely touching the ground and to propel the trainer as the direction of his movement is guided through the use of said means, a vertical projection extending outward from the back of said harness, said housing having a slot therein mating with said projection for slidable contact therewith, said projection having a series of holes along one side thereof, and a spring loaded bolt mounted and aligned within said housing for insertion in one of said series of holes for easily and quickly adjusting the height of said harness to accommodate any height.

2. The trainer of claim 1 including a seat detachably mounted to the back portion of said harness allowing the child to be wheeled in a sitting position and to walk in the alternative, said means being pivoted and locked into position as a third leg making contact with the ground when it is desired for the child to sit in a stationary position in one place.

3. A trainer, comprising a two wheeled frame, a housing detachably mounted to the top of said frame, a harness adjustably and releasably connected at the front surface of said housing for firmly and comfortably holding a child in an upright position, means pivotally connected to the back of said housing for guiding and holding up the trainer, said harness allowing any height child to have his feet just barely touching the ground and to propel the trainer as the direction of his movement is guided through the use of said means, a seat detachably mounted to the back portion of said harness allowing the child to be wheeled in a sitting position and to walk in the alternative, said means being pivoted and locked into position as a third leg making contact with the ground when it is desired for the child to sit in a stationary position in one place, a vertical projection extending outward from the back of said harness, said housing having a slot therein mating with said projection for slidable contact therewith, said projection having a series of holes along one side thereof, and a spring loaded bolt mounted and aligned with said housing for insertion in one of said series of holes for easily and quickly adjusting the height of said harness to accommodate any height child.

4. The trainer of claim 3, wherein said bolt is pulled out of one of said series of holes so that said harness and said seat may be slidably removed from the rest of the trainer for use elsewhere, especially after the child learns to walk without assistance.

* * * * *